March 6, 1928.  J. COIBION  1,661,789

REVOLUBLE CUTTER

Filed July 2, 1926

Inventor:
John Coibion,
By Hugh K. Wagner,
Attorney.

Patented Mar. 6, 1928.

1,661,789

UNITED STATES PATENT OFFICE.

JOHN COIBION, OF RICHMOND HEIGHTS, MISSOURI.

REVOLUBLE CUTTER.

Application filed July 2, 1926. Serial No. 120,044.

This invention relates to tools for forming bodies of revolution by reason of the rotation of the tool relatively to the body, and has more particular reference to a revoluble cutter adapted for dressing or trimming the base of bowling pins and the like, although certain salient features of the invention are applicable to turning, facing, grinding, and forming tools generally.

The lower peripheral edges of bowling pins become battered and worn after repeated use to a degree which renders them unfit for further use. Badly worn pins are unstable and can not be made to stand up properly. Hitherto, pins so worn have had their bases trimmed to normal by the ordinary process of facing them in a wood lathe. Such a process, as is well known, requires a preliminary setting up and chucking of the pin, besides well-known adjustments of the tool and manipulations of the lathe, all of which consumes considerable time, besides taking a deeper cut than is really necessary to restore the base to its original shape. Furthermore, the usual process is performed in two separate operations, the base proper being faced in one operation, and the cavity in the base being recut to its standard dimensions in another operation.

Accordingly, an object of the present invention is to provide a tool which needs no manipulation while cutting.

Another object of this invention is the provision of a tool which will face the base and rebore the cavity in the base in a single operation.

Another object of this invention is the provision of a tool which can be operated to remove no more material than is necessary in reforming the base.

Another object is to provide such a tool having means for automatically centering the pins or work relatively to the tool.

Another object is to provide simple means for removably securing the cutters and centering means to the revoluble head of the tool.

Other objects and advantages, more or less ancillary to the foregoing, will appear in the course of the following description of a preferred embodiment of the invention.

Figure 1:
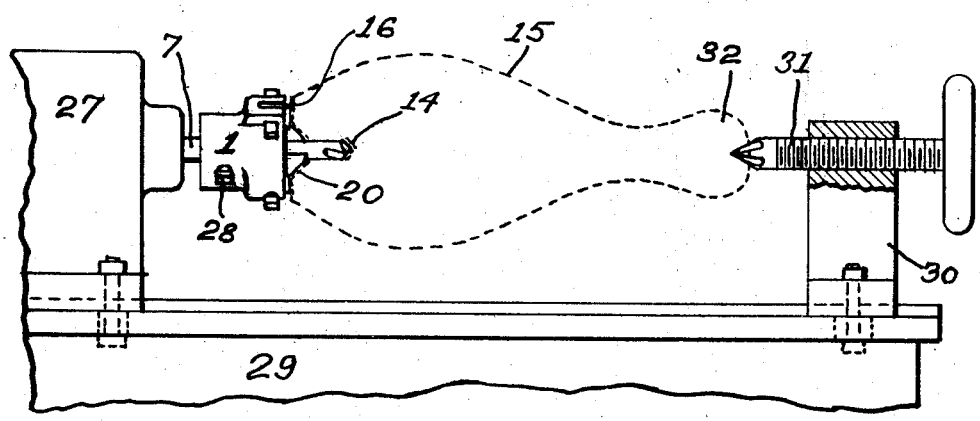
Figures 2, 3:
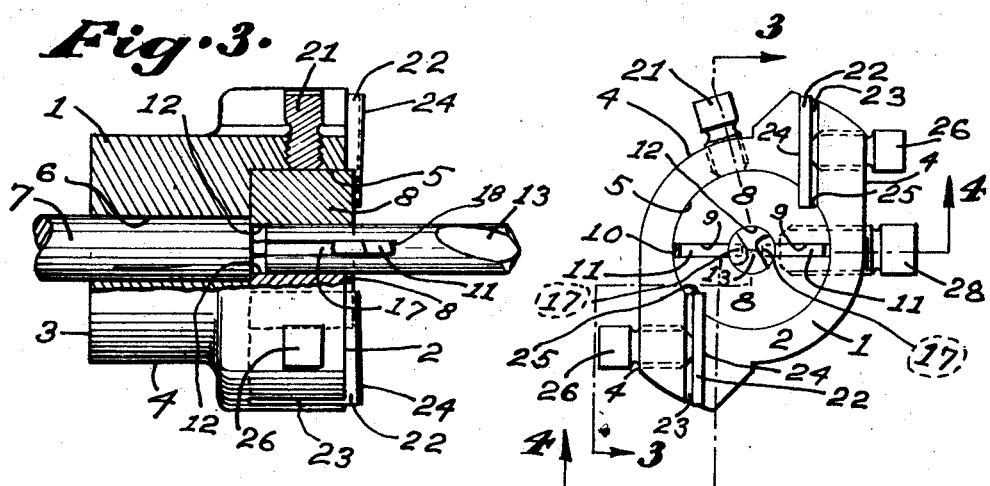

In the accompanying drawings forming part of this specification, in which like numbers of reference denotes like parts wherever they occur, Figure 1 is an elevation of a special lathe arrangement illustrating the manner of using the tool;

Figure 2 is a view of the operating end of the tool; and

Figure 4:
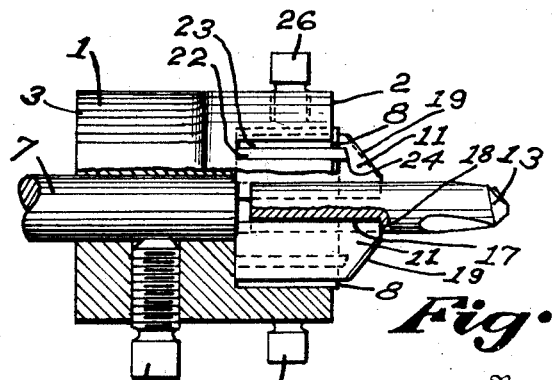

Figures 3 and 4 are views partly in elevation and partly in section on the lines 3—3 and 4—4, respectively, in Figure 2.

The illustrated embodiment of the invention includes a revoluble cutter-head 1, preferably having a front or operating end face 2, a rear end face 3, and lateral surface 4. A concentric cylindrical cavity 5 is recessed into the front face 2 and a bore 6 for an arbor or spindle 7 extends inwardly from the rear end face 3 and emerges into the cavity 5. A pair of substantially semi-cylindrical blocks 8 are seated diametrically opposite to one another in the cavity 5, their inner straight faces 9 being spaced apart to form intervening sockets 10 for cutter-bars or blades 11, and the said inner faces, also, presenting axially extending opposing sockets 12 for the diametrically opposite sides of a centering stem 13, adapted to fit into the conventional hole 14 in the base of the bowling pins 15, so as to center the head 1 with relation thereto. The centering stem 13 is preferably in the form of a drill, so that the depth of the hole 14 is maintained as the base 16 of the pin is being dressed by the cutter-head. The inner longitudinal end faces of the cutter-blades 11 are socketed in longitudinal extending grooves or channels 17, recessed in opposite sides of the shank of the drill 13, the shoulders 18 at the outer ends of the grooves 17 retaining the blades 11 in the sockets 10. The inclined cutting edges 19 of the blades 11 dress the conical cavity 20 in the base of the pin 15. The shank of drill 13 is clamped between the jaws 8 by means of a set screw 21, that screws into the surface 4 and against the side of one of the jaws 8. Blades 22, seated in slots or sockets 23 in the end face 2 and projecting therefrom present cutting edges 24 that dress the base 16 of the pins. The blades 22 and sockets 23 preferably extend substantially tangentially from the cavity 5 and preferably substantially at right angles to the blades 11 for the sake of providing a compact structure. The jaws 8 are preferably provided with notches 25, into which the inner ends of the blades 22 extend, so that the engagement of blades 22 with the jaws 8 supplements that of the set screw 21 on the said jaws to prevent rotation of the later in the cavity 5. Set screws 26 screw into the surface 4 and clamp the blades 22 against their seats in the slots 23.

In order to attain some of the objects of the invention, it is merely necessary that there be relative movement between the tool 1 and the work 15, and either one may rotate while the other remains stationary. The head 1, however, is preferably rotated, being affixed to any suitable arbor 7, preferably the shaft of an electric motor 27, by means of a set screw 28. The motor 27 is preferably mounted on one end of the bed 29 of a lathe, and a tail stock 30 of any usual or suitable type is mounted on the other end of the bed 29, as shown in Figure 1. To dress the base of the pin 15, the base is slipped over the drill 13, and the dead center 31 in the tail stock 30 is brought into biting engagement with the head 32 of the pin. It will be observed that the center 31 may be adjusted so that the cutter removes only enough material from the base of the pin to correct the deformations thereof.

Having thus fully described this invention, I hereby reserve the benefit of all changes in form, arrangement, order, or use of parts, as it is evident that many minor changes may be made therein without departing from the spirit of this invention or the scope of the following claims:

I claim:

1. A tool of the character described comprising opposing clamping jaws, a centering stem clamped therebetween and provided with sockets on the opposite sides that span the gap between the said jaws, and a pair of cutting blades mounted between said jaws on opposite sides of said stem and having their inner ends projecting into the said sockets.

2. A tool of the character described comprising a revoluble head having an end face presenting a grooved projecting centering stem, a pair of cutter blades engaging said grooved stem and extending radially from opposite sides thereof and adapted to form a cavity in the base of bowling pins and the like, and a second pair of blades projecting from opposite sides of the said end face and adapted to face the base of the said pins.

3. A tool of the character described comprising a revoluble head having a central cylindrical cavity, a pair of opposing semi-cylindrical jaws therein that are separated to provide a diametrically extending socket therebetween and that have axially extending sockets in their opposing faces and notches in their periphery, a centering stem in the axially extending sockets, a cutting blade in the diametrically extending socket, and a pair of cutting blades borne by the said head and extending inwardly into the said notches.

4. A tool of the character described comprising a revoluble head having a central cavity, a pair of jaws mounted in said cavity having their inner faces spaced apart to define intervening sockets and presenting axially extending opposed sockets, a centering stem mounted in said opposed sockets and radially extending cutter bars mounted in said intervening sockets.

5. A tool of the character described comprising a revoluble head having a central cylindrical cavity, a pair of opposing semi-cylindrical jaws mounted therein and having their inner faces spaced apart to define intervening sockets and further presenting axially extending opposed sockets, centering means mounted in said sockets and presenting longitudinally extending channels disposed on opposite sides and each forming a continuation of said intervening sockets and a pair of diametrically opposed cutter bars fitting into said intervening sockets and extending into the channels in said centering means.

In testimony whereof I hereunto affix my signature.

JOHN COIBION.